United States Patent
Hagman

(10) Patent No.: US 8,464,773 B2
(45) Date of Patent: Jun. 18, 2013

(54) TAPE REMOVAL APPARATUS AND PROCESS

(75) Inventor: Thomas J. Hagman, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/189,160

(22) Filed: Jul. 22, 2011

(65) Prior Publication Data

US 2011/0277941 A1 Nov. 17, 2011

Related U.S. Application Data

(63) Continuation of application No. 11/829,525, filed on Jul. 27, 2007, now Pat. No. 8,029,642.

(51) Int. Cl.
*B32B 38/10* (2006.01)

(52) U.S. Cl.
USPC ........... 156/758; 156/707; 156/715; 156/716; 156/760; 156/764; 156/765

(58) Field of Classification Search
USPC .............. 156/707, 715, 716, 758, 760, 764, 156/765
See application file for complete search history.

(56) References Cited

U.S. PATENT DOCUMENTS

| 799,374 A | 9/1905 | Gray et al. |
|---|---|---|
| 920,776 A | 5/1909 | Pohl |
| 1,132,837 A | 3/1915 | Eggleston |
| 1,195,554 A | 8/1916 | Bourdin |
| 1,370,339 A | 3/1921 | Midgley |
| 1,420,271 A | 6/1922 | Mclane |
| 1,464,632 A | 8/1923 | Wayne |
| 1,512,096 A | 10/1924 | Hopkinson |
| 1,930,733 A | 10/1933 | Tomlin |
| 2,182,358 A | 12/1939 | Sherts et al. |
| 2,220,760 A | 11/1940 | Gates et al. |
| 2,345,541 A | 3/1944 | Scholze, Jr. |
| 2,722,590 A | 11/1955 | Engler |
| 2,871,716 A | 2/1959 | Stade |
| 3,037,898 A | 6/1962 | Zumofen |

(Continued)

FOREIGN PATENT DOCUMENTS

| DE | 2505223 | 8/1976 |
|---|---|---|
| DE | 20120792 | 5/2003 |

(Continued)

OTHER PUBLICATIONS

Ashizawa et al., "Manufacturing Technology for Polymer Composite Structures," JTEC Panel Report on Advanced Manufacturing Technology for Polymer Composite Structures in Japan, Apr. 1994, 20 pages.

(Continued)

*Primary Examiner* — Mark A Osele
*Assistant Examiner* — Nickolas Harm
(74) *Attorney, Agent, or Firm* — Yee & Associates, P.C.

(57) ABSTRACT

An apparatus and method is provided for removing a selected portion of tape material from backing paper. One embodiment of an apparatus may include a supply reel, at least one cutting member, at least one bending member, and first and second vacuum rollers. The apparatus may further include pinch rollers, scraping members, and scrap bins. The apparatus may allow for the removal of scrap tape material from the backing paper.

13 Claims, 10 Drawing Sheets

U.S. PATENT DOCUMENTS

| | | |
|---|---|---|
| 3,137,452 A | 6/1964 | Winders |
| 3,329,181 A | 7/1967 | Buss et al. |
| 3,574,040 A | 4/1971 | Chitwood et al. |
| 3,602,416 A | 8/1971 | Basche et al. |
| 3,684,278 A * | 8/1972 | Takahaski ............... 271/281 |
| 3,695,977 A | 10/1972 | Kandelaki et al. |
| 3,775,219 A | 11/1973 | Karlson et al. |
| 3,810,805 A | 5/1974 | Goldsworthy et al. |
| 3,844,822 A | 10/1974 | Boss et al. |
| 3,910,522 A | 10/1975 | Lee et al. |
| 3,970,831 A | 7/1976 | Hegyi |
| 3,992,240 A | 11/1976 | Kuehn, Jr. |
| 4,091,979 A | 5/1978 | Browder |
| 4,100,004 A | 7/1978 | Moss et al. |
| 4,133,711 A | 1/1979 | August et al. |
| 4,135,447 A | 1/1979 | Barnes et al. |
| 4,186,861 A | 2/1980 | Steinhilber |
| 4,208,238 A | 6/1980 | August et al. |
| 4,234,374 A | 11/1980 | Frank |
| 4,241,884 A | 12/1980 | Lynch |
| 4,259,144 A | 3/1981 | Ballentine |
| 4,267,951 A | 5/1981 | Grant et al. |
| 4,285,752 A | 8/1981 | Higgins |
| 4,292,108 A | 9/1981 | Weiss et al. |
| 4,328,061 A | 5/1982 | Off et al. |
| 4,351,688 A | 9/1982 | Weiss et al. |
| 4,351,992 A | 9/1982 | Crouch |
| 4,382,836 A | 5/1983 | Frank |
| 4,419,170 A | 12/1983 | Blad |
| 4,432,828 A | 2/1984 | Siempelkamp et al. |
| 4,461,669 A | 7/1984 | Dontscheff |
| 4,462,551 A | 7/1984 | Bloch |
| 4,491,493 A | 1/1985 | Eaton |
| 4,506,969 A | 3/1985 | Baker |
| 4,508,584 A | 4/1985 | Charles |
| 4,531,992 A | 7/1985 | Eaton |
| 4,541,886 A | 9/1985 | Marlow et al. |
| 4,557,783 A | 12/1985 | Grone et al. |
| 4,557,790 A | 12/1985 | Wisbey |
| 4,560,433 A | 12/1985 | Frank |
| 4,569,716 A | 2/1986 | Pugh |
| 4,574,029 A | 3/1986 | Murray |
| 4,588,466 A | 5/1986 | Eaton |
| 4,591,402 A | 5/1986 | Evans et al. |
| 4,627,886 A | 12/1986 | Grone et al. |
| 4,636,276 A | 1/1987 | Nozaka |
| 4,680,806 A | 7/1987 | Bolza-Schunemann |
| 4,696,707 A | 9/1987 | Lewis et al. |
| 4,699,683 A | 10/1987 | McCowin |
| 4,706,442 A | 11/1987 | Riemenschneider |
| 4,707,212 A | 11/1987 | Hailey et al. |
| 4,750,965 A | 6/1988 | Pippel et al. |
| 4,781,782 A | 11/1988 | Luhman et al. |
| 4,799,981 A | 1/1989 | Stone et al. |
| 4,842,215 A | 6/1989 | Takami |
| 4,867,834 A | 9/1989 | Alenskis et al. |
| 4,877,471 A | 10/1989 | McCowin et al. |
| 4,878,984 A | 11/1989 | Bourrieres |
| 4,880,488 A | 11/1989 | Matsui et al. |
| 4,909,880 A | 3/1990 | Kittelson et al. |
| 4,938,824 A | 7/1990 | Youngkeit |
| 4,943,338 A | 7/1990 | Wisbey |
| 4,978,417 A | 12/1990 | Grimshaw et al. |
| 4,990,213 A | 2/1991 | Brown et al. |
| 5,000,397 A | 3/1991 | Darrieux |
| 5,041,179 A | 8/1991 | Shinno et al. |
| 5,045,147 A | 9/1991 | Benson et al. |
| 5,100,493 A | 3/1992 | Leclere et al. |
| 5,110,395 A | 5/1992 | Vaniglia |
| 5,114,519 A | 5/1992 | Grimshaw et al. |
| 5,120,976 A | 6/1992 | Clayton et al. |
| 5,148,572 A | 9/1992 | Wells et al. |
| 5,197,198 A | 3/1993 | Onozato |
| 5,200,018 A | 4/1993 | Gill et al. |
| 5,213,646 A | 5/1993 | Zsolnay et al. |
| 5,249,120 A | 9/1993 | Foley |
| 5,290,386 A | 3/1994 | Trudeau |
| 5,290,389 A | 3/1994 | Shupe et al. |
| 5,294,803 A | 3/1994 | Pahr |
| 5,345,399 A | 9/1994 | Collins |
| 5,397,415 A | 3/1995 | Manabe et al. |
| 5,431,749 A | 7/1995 | Messner |
| 5,448,505 A | 9/1995 | Novak |
| 5,480,508 A | 1/1996 | Manabe et al. |
| 5,482,589 A | 1/1996 | Shin et al. |
| 5,560,942 A | 10/1996 | Curry |
| 5,562,788 A | 10/1996 | Kitson et al. |
| 5,627,647 A | 5/1997 | Baan et al. |
| 5,645,677 A | 7/1997 | Cahuzac et al. |
| 5,659,229 A | 8/1997 | Rajala |
| 5,698,066 A | 12/1997 | Johnson et al. |
| 5,700,347 A | 12/1997 | McCowin |
| 5,725,175 A | 3/1998 | Thundathil |
| 5,879,505 A | 3/1999 | Fujisawa et al. |
| 5,954,917 A | 9/1999 | Jackson et al. |
| 6,041,840 A | 3/2000 | Ogawa |
| 6,073,670 A | 6/2000 | Koury |
| 6,096,164 A | 8/2000 | Benson et al. |
| 6,100,986 A | 8/2000 | Rydningen |
| 6,112,792 A | 9/2000 | Barr et al. |
| 6,164,477 A | 12/2000 | Druckman et al. |
| 6,215,553 B1 | 4/2001 | Rider et al. |
| 6,240,333 B1 | 5/2001 | McGee |
| 6,262,814 B1 | 7/2001 | Furukawa |
| 6,312,247 B1 | 11/2001 | Kassuelke et al. |
| 6,315,235 B1 | 11/2001 | Breyer et al. |
| 6,325,568 B1 | 12/2001 | Druckman et al. |
| 6,391,436 B1 | 5/2002 | Xu et al. |
| 6,436,528 B1 | 8/2002 | Kulper et al. |
| 6,441,905 B1 | 8/2002 | Tojyo et al. |
| 6,451,152 B1 | 9/2002 | Holmes et al. |
| 6,459,494 B1 | 10/2002 | Kurokawa et al. |
| 6,474,389 B1 | 11/2002 | Steelman et al. |
| 6,520,234 B1 | 2/2003 | Anderson et al. |
| 6,544,367 B1 | 4/2003 | Fujimoto et al. |
| 6,638,388 B2 | 10/2003 | Nagata et al. |
| 6,675,688 B2 | 1/2004 | Ostini |
| 6,706,131 B2 | 3/2004 | Steelman et al. |
| 6,748,836 B2 | 6/2004 | Vivirito et al. |
| 6,752,190 B1 | 6/2004 | Boll et al. |
| 6,764,754 B1 | 7/2004 | Hunter et al. |
| 6,767,426 B1 | 7/2004 | Yamamoto |
| 6,773,537 B2 | 8/2004 | Erickson et al. |
| 6,799,081 B1 | 9/2004 | Hale et al. |
| 6,799,619 B2 | 10/2004 | Holmes et al. |
| 6,823,342 B2 | 11/2004 | Wallen et al. |
| 6,860,957 B2 | 3/2005 | Sana et al. |
| 6,900,547 B2 | 5/2005 | Polk, Jr. et al. |
| 6,966,966 B2 | 11/2005 | Koizumi et al. |
| 6,968,971 B2 | 11/2005 | Ely |
| 6,979,501 B2 | 12/2005 | Merton |
| 6,984,429 B2 | 1/2006 | Thunhorst et al. |
| 7,010,544 B2 | 3/2006 | Wallen et al. |
| 7,048,024 B2 | 5/2006 | Clark et al. |
| 7,063,118 B2 | 6/2006 | Hauber et al. |
| 7,137,182 B2 | 11/2006 | Nelson |
| 7,206,665 B2 | 4/2007 | Groppe |
| 7,213,629 B2 | 5/2007 | Ledet et al. |
| 7,282,107 B2 | 10/2007 | Johnson et al. |
| 7,293,590 B2 | 11/2007 | Martin |
| 7,326,312 B1 | 2/2008 | Rust et al. |
| 7,337,818 B2 | 3/2008 | Briese et al. |
| 7,341,086 B2 | 3/2008 | Nelson et al. |
| 7,376,480 B2 | 5/2008 | Hagen et al. |
| 7,407,556 B2 | 8/2008 | Oldani et al. |
| 7,419,031 B2 | 9/2008 | Liguore et al. |
| 7,455,740 B2 | 11/2008 | Bostanjoglo et al. |
| 7,455,742 B2 | 11/2008 | Ledet et al. |
| 7,472,736 B2 | 1/2009 | Kisch et al. |
| 7,478,780 B2 | 1/2009 | Wilding et al. |
| 7,517,426 B2 | 4/2009 | Mano et al. |
| 7,527,084 B2 | 5/2009 | Kaczkowski |
| 7,536,242 B2 | 5/2009 | Ledet et al. |
| 7,591,294 B2 | 9/2009 | Wampler et al. |
| 7,643,970 B2 | 1/2010 | Drumheller et al. |
| 7,681,615 B2 | 3/2010 | McCowin |
| 7,717,151 B2 | 5/2010 | Wampler et al. |

| | | |
|---|---|---|
| 7,747,421 B2 | 6/2010 | Tang et al. |
| 7,748,425 B2 | 7/2010 | Tingley |
| 7,766,063 B2 | 8/2010 | Lauder et al. |
| 7,769,481 B2 | 8/2010 | Tang et al. |
| 7,809,454 B2 | 10/2010 | Hu et al. |
| 7,824,512 B2 | 11/2010 | Lauder et al. |
| 7,842,145 B2 | 11/2010 | Hogg |
| 7,849,903 B2 | 12/2010 | Vaniglia |
| 7,867,352 B2 | 1/2011 | Johnson et al. |
| 7,922,856 B2 | 4/2011 | Hagman et al. |
| 8,029,642 B2 | 10/2011 | Hagman |
| 8,147,637 B2 | 4/2012 | Kisch et al. |
| 8,156,988 B2 | 4/2012 | Martinez |
| 8,205,532 B2 | 6/2012 | DeVlieg et al. |
| 2003/0015298 A1 | 1/2003 | Steelman et al. |
| 2003/0102070 A1 | 6/2003 | Black et al. |
| 2003/0145932 A1 | 8/2003 | Holmes et al. |
| 2004/0026025 A1 | 2/2004 | Sana et al. |
| 2004/0112534 A1* | 6/2004 | Koizumi et al. ............. 156/344 |
| 2004/0226651 A1 | 11/2004 | Ledet et al. |
| 2005/0016671 A1 | 1/2005 | Sharp |
| 2005/0039842 A1 | 2/2005 | Clark et al. |
| 2005/0039843 A1 | 2/2005 | Johnson et al. |
| 2005/0194210 A1 | 9/2005 | Panossian |
| 2005/0227124 A1 | 10/2005 | Merton |
| 2005/0247396 A1 | 11/2005 | Oldani et al. |
| 2006/0073309 A1 | 4/2006 | Hogg |
| 2006/0090856 A1 | 5/2006 | Nelson et al. |
| 2006/0106507 A1 | 5/2006 | Ledet et al. |
| 2006/0118244 A1 | 6/2006 | Zaballos et al. |
| 2006/0147669 A1 | 7/2006 | Mano et al. |
| 2006/0162143 A1 | 7/2006 | Nelson et al. |
| 2006/0180270 A1 | 8/2006 | Ledet et al. |
| 2006/0226651 A1 | 10/2006 | Griswold et al. |
| 2006/0260751 A1 | 11/2006 | Lauder et al. |
| 2007/0029030 A1 | 2/2007 | McCowin |
| 2007/0034340 A1 | 2/2007 | Kaczkowski |
| 2007/0039434 A1 | 2/2007 | DeVlieg et al. |
| 2007/0044896 A1 | 3/2007 | Tingley |
| 2007/0044900 A1 | 3/2007 | Tingley |
| 2007/0069080 A1 | 3/2007 | Rassaian et al. |
| 2007/0102239 A1 | 5/2007 | Liquore et al. |
| 2007/0106407 A1 | 5/2007 | Drumheller et al. |
| 2007/0106418 A1 | 5/2007 | Hagen et al. |
| 2007/0144676 A1 | 6/2007 | Tang et al. |
| 2007/0150087 A1 | 6/2007 | Tang et al. |
| 2007/0187024 A1 | 8/2007 | Johnson et al. |
| 2007/0234907 A1 | 10/2007 | Torres Martinez |
| 2008/0277057 A1 | 11/2008 | Montgomery et al. |
| 2008/0282863 A1 | 11/2008 | McCowin |
| 2008/0302483 A1 | 12/2008 | Vaniglia |
| 2009/0025875 A1 | 1/2009 | Hagman |
| 2009/0076638 A1 | 3/2009 | Hu et al. |
| 2009/0078361 A1 | 3/2009 | Kisch et al. |
| 2009/0079998 A1 | 3/2009 | Anderson et al. |
| 2009/0166467 A1 | 7/2009 | Hagman et al. |
| 2009/0205767 A1 | 8/2009 | Lauder et al. |
| 2009/0211698 A1 | 8/2009 | McCowin |
| 2010/0006205 A1 | 1/2010 | McCowin et al. |
| 2010/0193103 A1 | 8/2010 | McCowin |
| 2010/0224716 A1 | 9/2010 | McCowin |
| 2010/0230043 A1 | 9/2010 | Kisch |
| 2011/0114265 A1 | 5/2011 | Hagman et al. |

FOREIGN PATENT DOCUMENTS

| | | |
|---|---|---|
| DE | 10342658 | 4/2005 |
| EP | 1775108 | 4/2007 |
| EP | 1804146 | 7/2007 |
| EP | 1859917 | 11/2007 |
| EP | 1977882 | 10/2008 |
| EP | 1992473 | 11/2008 |
| EP | 2077246 | 7/2009 |
| EP | 2228200 | 9/2010 |
| EP | 2228333 | 9/2010 |
| ES | 2253005 | 5/2006 |
| GB | 2065566 | 7/1981 |
| JP | 05126536 | 5/1993 |
| JP | 07182724 | 7/1995 |
| JP | 08327330 | 12/1996 |
| JP | 09210665 | 8/1997 |
| JP | 2006347121 | 12/2006 |
| SU | 1019227 | 5/1983 |
| WO | WO0196223 | 12/2001 |
| WO | WO03035380 | 5/2003 |
| WO | WO2005030458 | 4/2005 |
| WO | WO2005105641 | 11/2005 |
| WO | WO2006021601 | 3/2006 |
| WO | WO2006060270 | 6/2006 |
| WO | WO2006101379 | 9/2006 |
| WO | WO2006118692 | 11/2006 |
| WO | WO2009038895 | 3/2009 |
| WO | WO2009038943 | 3/2009 |
| WO | WO2009108517 | 9/2009 |
| WO | WO2010005996 | 1/2010 |

OTHER PUBLICATIONS

Cincinnati Milacron, "Into the Future With Better Ways to Automate the Manufacture of Composite Parts," Cincinnati Milacron Publication No. SP-152-3, 1998, 22 pages.

Collins, "Measuring Small," Computer Technology Review, vol. XXV No. 3, 2005, 5 pages.

European Search Report dated Sep. 15, 2008, regarding Application No. EP08008877 (EP1992473), 3 pages.

European Search Report dated Nov. 30, 2010, regarding Application No. EP08173139 (EP2077246), 2 pages.

European Search Report dated Jun. 7, 2010, regarding Application No. EP10250405 (EP2228333), 2 pages.

European Search Report dated Jun. 23, 2010, regarding Application No. EP10250484 (EP2228200), 3 pages.

Evans et al., "Fiber Placement Process Study," SAMPE 34th Symposium Book of Proceedings, Reno, NV, May 8-11, 1989, pp. 1822-1833.

Guillermin, "Advanced Composite Engineering using MSC.Pantran and FiberSIM." Composite Design Technologies, Jul. 20, 2004, 15 pages.

International Search Report dated Apr. 1, 2005, regarding Application No. PCT/US2004/015144 (WO2005030458), 2 pages.

International Search Report dated Aug. 30, 2006, regarding Application No. PCT/US2006/010704 (WO2006118692), 3 pages.

International Search Report dated Dec. 3, 2008, regarding Application No. PCT/US2008/072450 (WO2009038895), 3 pages.

International Search Report dated Mar. 2, 2009, regarding Application No. PCT/US2008/074612 (WO2009038943), 4 pages.

International Search Report dated May 28, 2009 regarding Application No. PCT/US2009/034048 (WO2009108517), 2 pages.

International Search Report dated Feb. 5, 2010, regarding Application No. PCT/US2009/049850 (WO2010005996), 2 pages.

Koschmieder et al., "On-Line Tow Width Measurement in Filament Winding," Proceedings of the 45th International SAMPE Symposium and Exhibition, Long Beach, CA, May 21-25, 2000, pp. 1417-1426.

Morrison et al., "Automatic Controlled Apparatus for Producing Tobacco Smoke Filter Rods," USPTO Defensive Publication No. T941,011, Dec. 2, 1975, 3 pages.

Olsen et al., "Automated Composite Tape Lay-up Using Robotic Devices," Proceedings of the International Conference on Robotics and Automation, Atlanta, GA, May 1993, pp. 291-297.

USPTO Office Action dated Jan. 11, 2005 regarding U.S. Appl. No. 10/437,067, 10 pages.

USPTO Final Office Action dated Jul. 1, 2005 regarding U.S. Appl. No. 10/437,067, 9 pages.

USPTO Office Action dated Feb. 17, 2006 regarding U.S. Appl. No. 10/437,067, 10 pages.

USPTO Notice of Allowance dated Sep. 13, 2006 regarding U.S. Appl. No. 10/437,067, 7 pages.

USPTO Supplemental Notice of Allowance dated Dec. 27, 2006 regarding U.S. Appl. No. 10/437,067, 4 pages.

USPTO Office Action dated Feb. 6, 2008 regarding U.S. Appl. No. 11/116,222, 13 pages.

USPTO Final Office Action dated Sep. 5, 2008 regarding U.S. Appl. No. 11/116,222, 12 pages.

USPTO Notice of Allowance dated Mar. 27, 2009 regarding U.S. Appl. No. 11/116,222, 4 pages.
USPTO Office Action dated Jun. 6, 2009 regarding U.S. Appl. No. 11/116,222, 11 pages.
USPTO Office Action dated Nov. 24, 2009 regarding U.S. Appl. No. 11/116,222, 9 pages.
USPTO Notice of Allowance dated Mar. 25, 2010 regarding U.S. Appl. No. 11/116,222, 5 pages.
USPTO Office Action dated Feb. 1, 2010 regarding U.S. Appl. No. 12/423,472, 36 pages.
USPTO Office Action dated Jul. 8, 2010 regarding U.S. Appl. No. 12/423,472, 25 pages.
USPTO Notice of Allowance dated Sep. 17, 2010 regarding U.S. Appl. No. 12/423,472, 6 pages.
USPTO Office Action dated Mar. 5, 2008 regarding U.S. Appl. No. 11/196,455, 12 pages.
USPTO Final Office Action dated Jul. 17, 2008 regarding U.S. Appl. No. 11/196,455, 11 pages.
USPTO Office Action dated Jan. 28, 2009 regarding U.S. Appl. No. 11/196,455, 10 pages.
USPTO Final Office Action dated Jul. 9, 2009 regarding U.S. Appl. No. 11/196,455, 8 pages.
USPTO Notice of Allowance dated Nov. 4, 2009 regarding U.S. Appl. No. 11/196,455, 8 pages.
USPTO Office Action dated Aug. 13, 2009 regarding U.S. Appl. No. 11/750,154, 9 pages.
USPTO Office Action dated Dec. 28, 2009 regarding U.S. Appl. No. 11/750,154, 7 pages.
USPTO Office Action dated May 25, 2010 regarding U.S. Appl. No. 11/750,154, 7 pages.
USPTO Final Office Action dated Sep. 14, 2010 regarding U.S. Appl. No. 11/750,154, 5 pages.
USPTO Office Action dated Aug. 21, 2009 regarding U.S. Appl. No. 11/856,372, 21 pages.
USPTO Final Office Action dated Jan. 27, 2010 regarding U.S. Appl. No. 11/856,372, 16 pages.
USPTO Notice of Allowance dated Apr. 30, 2010 regarding U.S. Appl. No. 11/856,372, 4 pages.
USPTO Supplemental Notice of Allowance dated Jul. 21, 2010 regarding U.S. Appl. No. 11/856,372, 2 pages.
USPTO Office Action dated Sep. 15, 2010 regarding U.S. Appl. No. 11/829,525, 11 pages.
Response to Office Action dated Nov. 18, 2010 regarding U.S. Appl. No. 11/829,525, 8 pages.
USPTO Final Office Action dated Feb. 2, 2011 regarding U.S. Appl. No. 11/829,525, 12 pages.
Response to Final Office Action dated Mar. 28, 2011 regarding U.S. Appl. No. 11/829,525, 8 pages.
USPTO Notice of Allowance dated Jun. 21, 2011 regarding U.S. Appl. No. 11/29,525, 8 pages.
USPTO Office Action dated Mar. 31, 2010 regarding U.S. Appl. No. 11/859,745, 18 pages.
USPTO Final Office Action dated Oct. 14, 2010 regarding U.S. Appl. No. 11/859,745, 22 pages.
USPTO Office Action dated Mar. 28, 2011 regarding U.S. Appl. No. 11/859,745, 24 pages.
USPTO Ex Parte Quayle Action dated Jan. 4, 2012 regarding U.S. Appl. No. 11/859,745, 9 pages.
USPTO Notice of Allowance dated Feb. 13, 2012 regarding U.S. Appl. No. 11/859,745, 9 pages.
USPTO Office Action dated Aug. 19, 2010 regarding U.S. Appl. No. 11/968,542, 10 pages.
USPTO Notice of Allowance dated Dec. 17, 2010 regarding U.S. Appl. No. 11/968,542, 9 pages.
USPTO Notice of Allowance dated Apr. 25, 2012 regarding U.S. Appl. No. 13/012,617, 16 pages.
USPTO Office Action dated May 17, 2011 regarding U.S. Appl. No. 12/038,155, 11 pages.
USPTO Final Office Action dated Oct. 19, 2011 regarding U.S. Appl. No. 12/038,155, 9 pages.
USPTO Office Action dated Nov. 7, 2011 regarding U.S. Appl. No. 12/498,307, 15 pages.
USPTO Final Office Action dated Mar. 8, 2012 regarding U.S. Appl. No. 12/498,307, 14 pages.
USPTO Office Action dated May 10, 2011 regarding U.S. Appl. No. 12/363,749, 10 pages.
USPTO Final Office Action dated Feb. 21, 2012 regarding U.S. Appl. No. 12/363,749, 7 pages.
USPTO Office Action dated Jun. 22, 2011 regarding U.S. Appl. No. 12/404,265, 10 pages.
USPTO Notice of Allowance dated Nov. 10, 2011 regarding U.S. Appl. No. 12/404,265, 9 pages.
USPTO Notice of Allowance dated Feb. 17, 2012 regarding U.S. Appl. No. 12/404,265, 11 pages.
USPTO Office Action dated Apr. 12, 2010 regarding U.S. Appl. No. 12/400,600, 14 pages.
USPTO Final Office Action dated Sep. 17, 2010 regarding U.S. Appl. No. 12/400,600, 18 pages.
USPTO Notice of Allowance dated Mar. 28, 2012 regarding U.S. Appl. No. 12/400,600, 5 pages.
USPTO Notice of Allowance, dated Jul. 9, 2012, regarding U.S. Appl. No. 13/012,617, 36 pages.
USPTO Supplemental Notice of Allowance, dated Jul. 31, 2012, regarding U.S. Appl. No. 12/400,600, 4 pages.
USPTO Notice of Allowance dated Jun. 8, 2012 regarding U.S. Appl. No. 11/859,745, 40 pages.
USPTO Supplemental Notice of Allowance dated Jun. 19, 2012 regarding U.S. Appl. No. 11/859,745, 38 pages.
USPTO Notice of Allowance, dated Jun. 28, 2012, regarding U.S. Appl. No. 12/400,600, 64 pages.

* cited by examiner

US 8,464,773 B2

TAPE REMOVAL APPARATUS AND PROCESS

This application is a continuation of application Ser. No. 11/829,525, filed Jul. 27, 2007, granted as U.S. Pat. No. 8,029,642 on Oct. 4, 2011.

BACKGROUND

Many apparatus and methods exist for automatically preparing cassette spools or reels wound with tape material on original backing paper or film. This prepeg tape material may be a composite, unidirectional tape which may be used to form a laminate. In one existing apparatus/method, tape material on backing paper is unrolled from a supply reel, the tape material is cut into the required configuration, removed from the original backing paper, and then transferred to another release backing paper and wound onto a cassette spool. However, the transferring of the tape material to another backing paper may create problems. The tape material may lose some of its tacking ability, may not align as well on the new backing paper, may not adhere well to the new backing paper, and may have placement problems when placed on a working surface. Further, the new backing paper may have a certain amount of stretch which may cause tension problems, may form wrinkles when the tape is placed onto a working surface, and/or may not allow good tacking of the tape material onto the working surface. This may cause problems with tape lifting from the working surface, or may cause wrinkles to be formed in the laminate being formed with the tape material. Moreover, the process of putting the tape material onto a new backing paper may require an excessive number of machines, may increase the costs, may increase the time required, may reduce efficiency, and/or may lead to one or more other problems.

An apparatus, and/or method for removing tape material from backing paper, is needed to decrease one or more problems associated with one or more of the existing apparatus and/or methods.

SUMMARY

In one aspect of the disclosure, an apparatus for removing tape material from backing paper is provided. The apparatus includes a supply reel for supplying and unrolling tape material on backing paper. The apparatus further includes at least one cutting member for cutting first and second spaced apart portions of unrolled tape material while still on backing paper, and for cutting a third portion, comprising adjacent first and second ends, of unrolled tape material while still on backing paper between cut first and second spaced apart portions of unrolled tape material. The apparatus additionally includes at least one bending member for pressing against backing paper upon which a cut third portion is disposed in order to separate cut first and second adjacent ends of unrolled tape material from backing paper. The apparatus further includes a first vacuum roller for rolling a cut first adjacent end of unrolled tape material at least partially around the first vacuum roller to remove from backing paper a cut unrolled tape material between a cut first adjacent end and a cut first portion. The apparatus also includes a second vacuum roller adjacent to the first vacuum roller for rolling a cut second adjacent end of unrolled tape material at least partially around the second vacuum roller to remove from backing paper a cut unrolled tape material between a cut second adjacent end and a cut second portion.

These and other features, aspects and advantages of the disclosure will become better understood with reference to the following drawings, description and claims.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
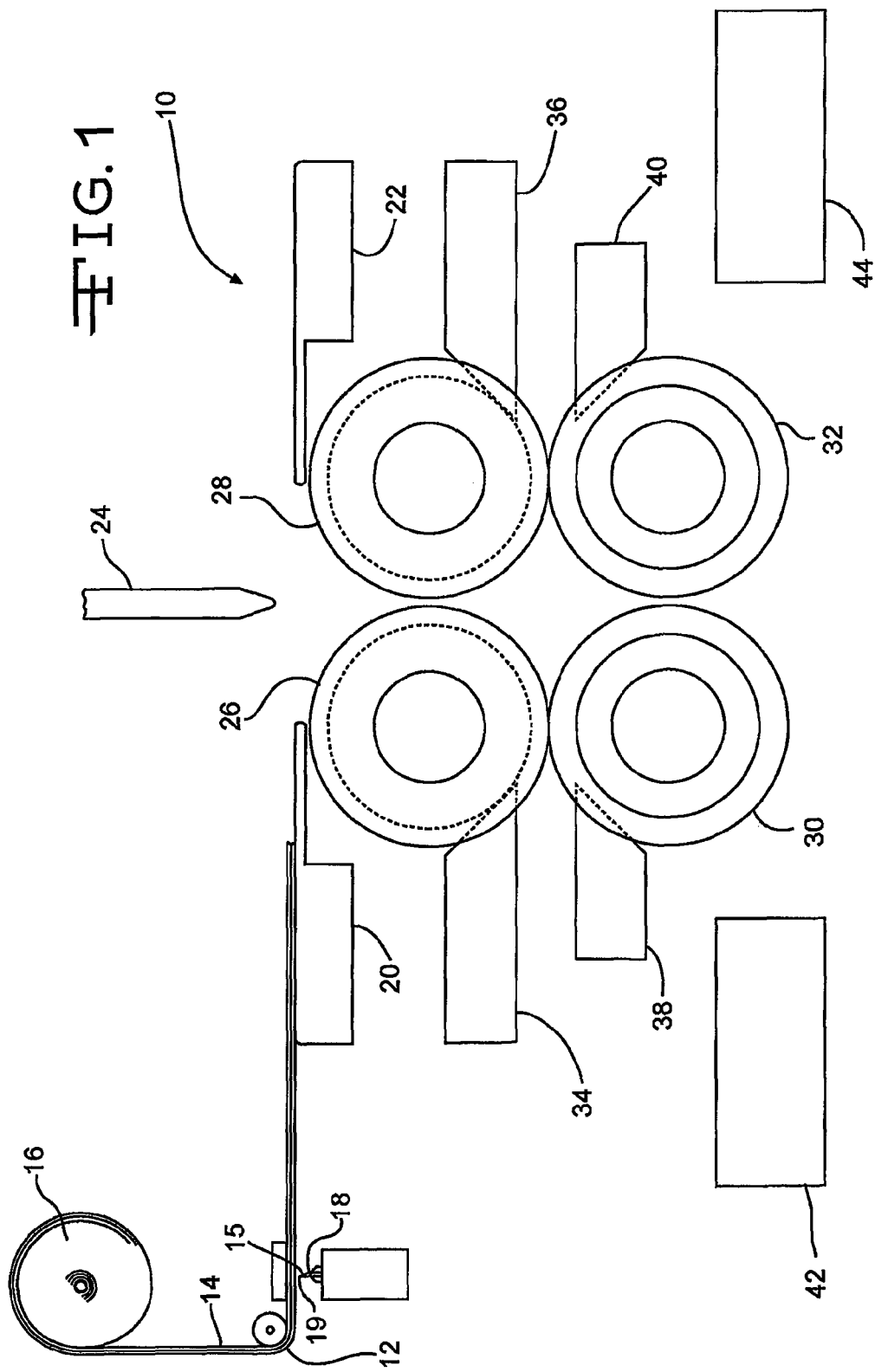
FIG. 1 shows a front view of one embodiment of an apparatus for removing tape material from backing paper in which the apparatus has unrolled and cut tape material.

FIG. 1 shows a front view of one embodiment of an apparatus 10 for removing tape material 12 from backing paper 14. The tape material 12 may comprise for example and without limitation a composite prepeg (pre-impregnated with resin) tape, a graphite, ceramic, aramid, glass, or other tape material. The tape material 12 may be unidirectional. The apparatus 10 may comprise a supply reel 16, at least one cutting member 18, a first shelf member 20, a second shelf member 22, at least one bending member 24, a first roller 26, a second roller 28, a third roller 30, a fourth roller 32, a first scraping member 34, a second scraping member 36, a third scraping member 38, a fourth scraping member 40, a first scrap bin 42, and a second scrap bin 44.

Figure 2:
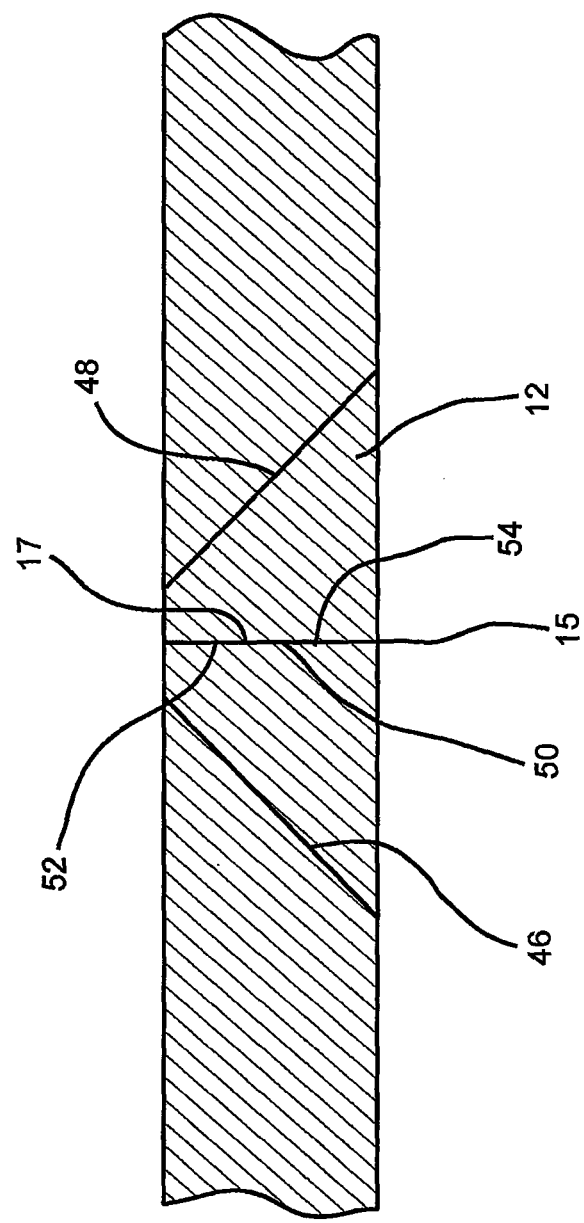
FIG. 2 shows a bottom view of a portion of the cut unrolled tape material of the embodiment of FIG. 1 without the apparatus.

In FIG. 1, the supply reel 16 has been used to supply and unroll the tape material 12, while still on the backing paper 14, to a location 15 over the one or more cutting members 18, which have one or more sharp edges 19. The one or more cutting members 18 has cut the unrolled tape material 12 at location 15. The tape material 12 is cut without cutting the backing paper 14. FIG. 2 shows a bottom view of a portion of the cut unrolled tape material 12 at location 15. As shown, the one or more cutting members 18 have been used to cut first and second spaced apart portions 46 and 48, which may comprise spaced apart angular cuts, of the unrolled tape material 12 which is still on the backing paper 14. The one or more cutting members 18 have further been used to cut a third portion 50 of the unrolled tape material 12 which is still on the backing paper 14, which may comprise a straight, perpendicular cut in the unrolled tape material 12, in substantially the center 17 of the cut first and second spaced apart portions 46 and 48. The cut third portion 50 may comprise adjacent first and second ends 52 and 54 of the cut unrolled tape material 12 on the backing paper 14. In other embodiments, the third portion 50 may be at any point in-between the cut first and second spaced apart portions 46 and 48. In still other embodiments, the first, second, and third portions 46, 48, and 50 may be of differing shapes, sizes, locations, orientations, and configurations. In still other embodiments, a varying number of cut portions may be utilized.

Figure 3:
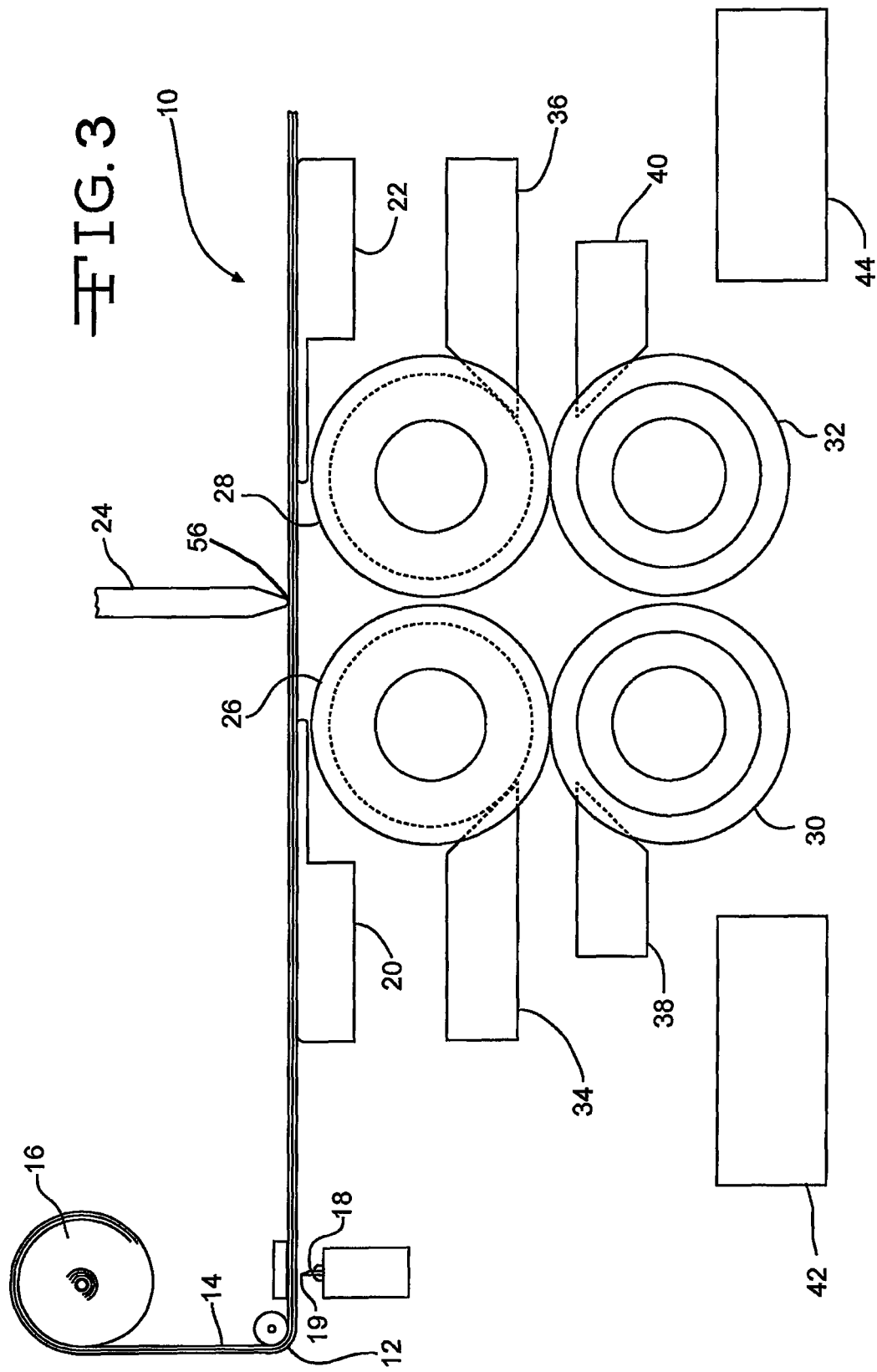
FIG. 3 is the same view of the embodiment of FIG. 3 at a different stage with the cut unrolled tape material on the backing paper having been moved to a location under a bending member.

FIG. 3 is the same view of the embodiment of FIG. 1 at a different stage with the cut unrolled tape material 12 on the backing paper 14 having been moved to a location 56 under the at least one bending member 24. The first and second shelf members 20 and 22 are keeping the tape material 12 on the backing paper 14 from coming in contact with the first and second rollers 26 and 28.

Figure 4:
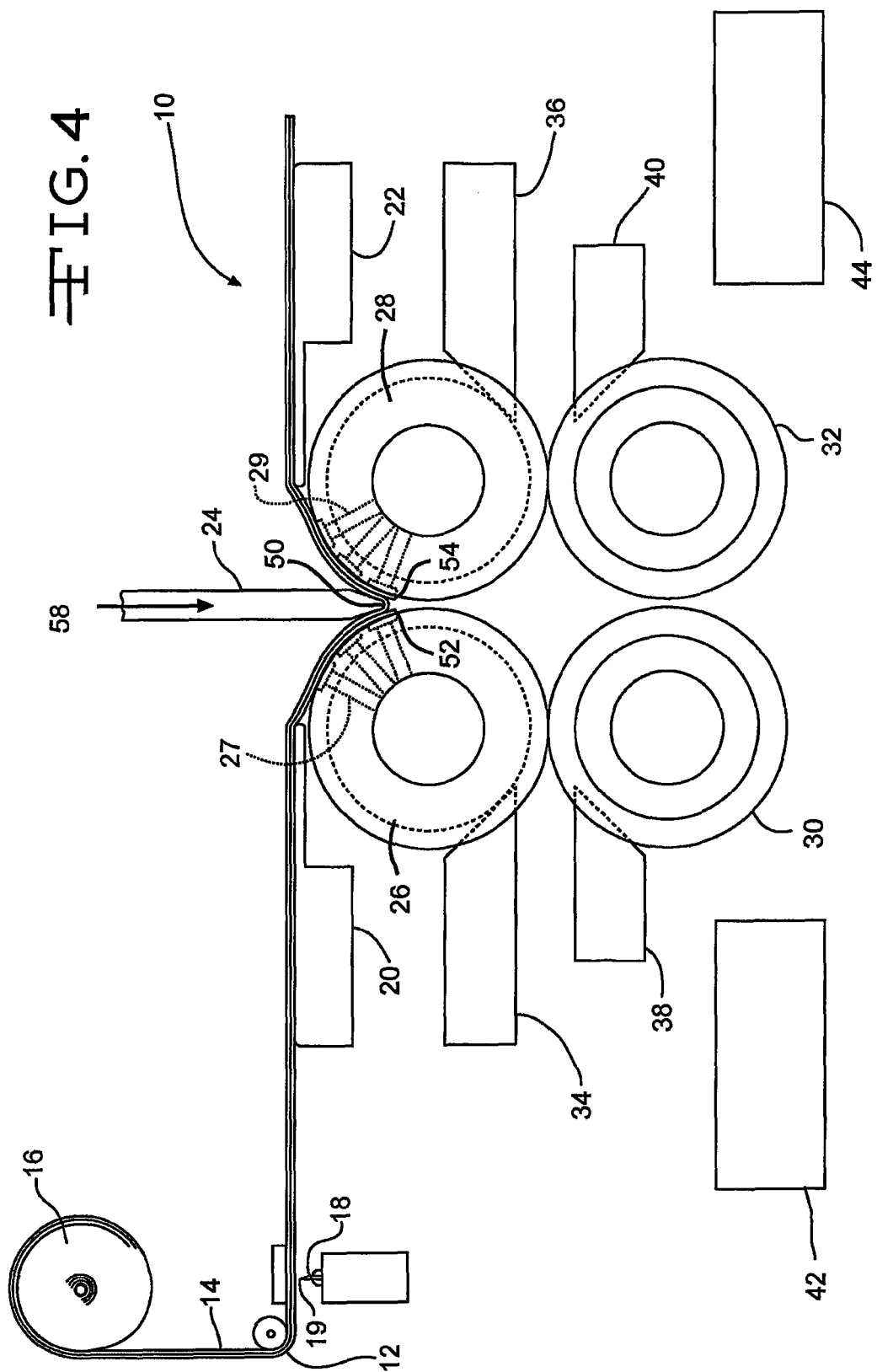
FIG. 4 is the same view of the embodiment of FIG. 3 at a different stage with the bending member pressing against the backing paper.
Figure 5:
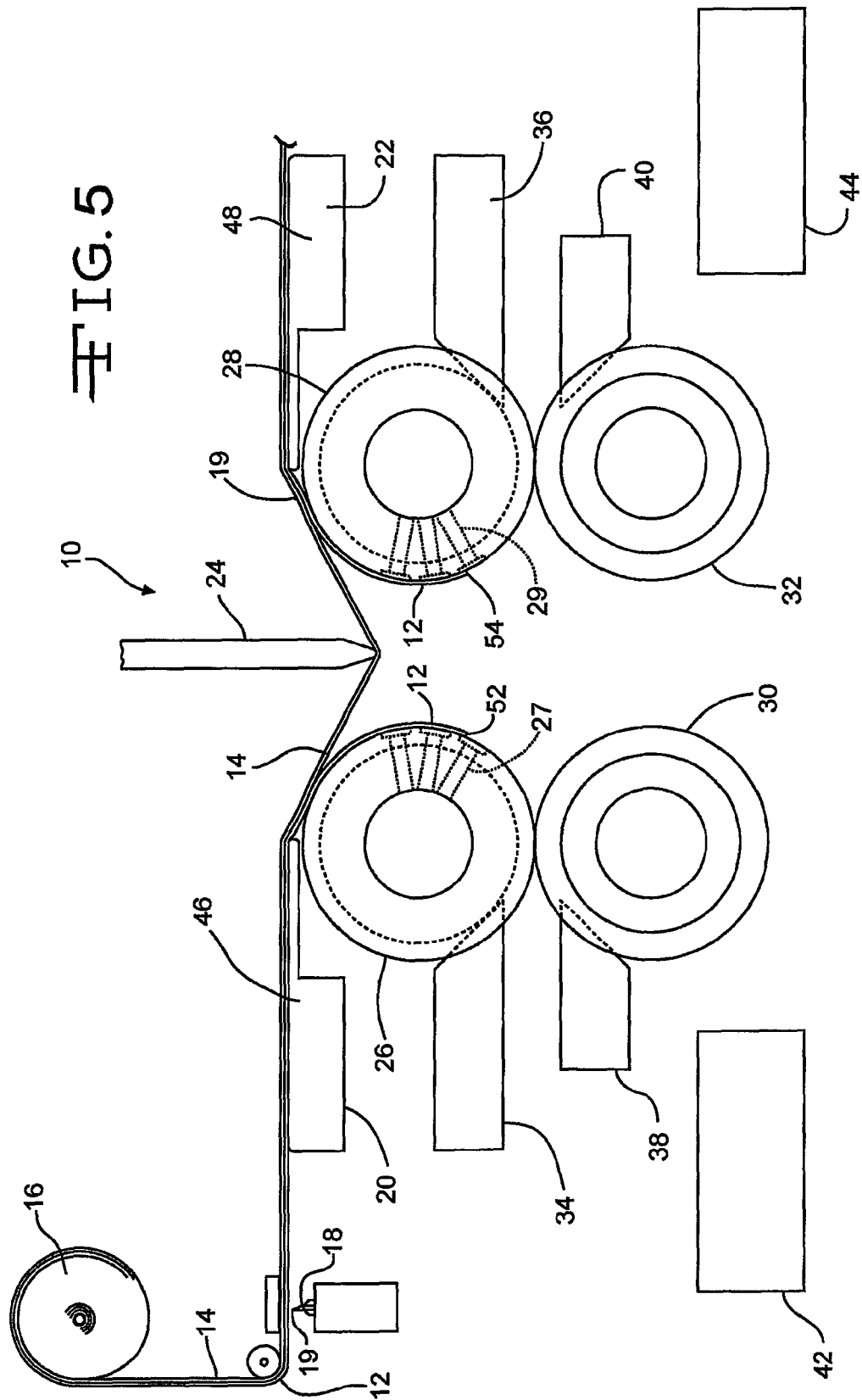
FIG. 5 is the same view of the embodiment of FIG. 4 at a different stage with cut unrolled tape material rolling around rollers.

FIG. 4 is the same view of the embodiment of FIG. 3 at a different stage with the at least one bending member 24 having been lowered along direction 58 in order to press against the backing paper 14 upon which the cut third portion 50 is disposed. The bending member 24 may comprise a bar member or other type of bending member. The pressing of the bending member 24 against the backing paper 14 has caused the cut third portion 50 to drop downward and be abutted against the initially adjacent first and second rollers 26 and 28. As shown in FIG. 5, due to the pressing of the at least one bending member 24 against the backing paper 14, the cut first and second adjacent ends 52 and 54 of the unrolled tape material 12 has begun to separate from the backing paper 14 which has remained intact. The first and second rollers 26 and 28 may each comprise vacuum rollers 27 and 29 which are adapted to provide vacuum forces on the cut unrolled tape material 12 to draw it towards the first and second rollers 26 and 28.

FIG. 5 is the same view of the embodiment of FIG. 4 at a different stage with the first roller 26 having been rolled clockwise and the second roller 28 having been rolled counterclockwise. It should be noted that the third roller 30, which may comprise a pinch roller abutting against the first roller 26, has rotated counterclockwise against the first roller 26. Similarly, the fourth roller 32, which may comprise a pinch roller abutting against the second roller 28, has rotated clockwise against the second roller 28. As shown, due to the vacuum attraction forces 27 of the first roller 26, the separated first adjacent end 52 of the unrolled tape material 12 has been held to roller 26 and has begun rolling partially around the first roller 26 to remove from the backing paper 14 more of the cut unrolled tape material 12 from the separated first adjacent end 52 towards the cut first portion 46. Similarly, due to the vacuum attraction forces 29 of the second roller 28, the separated second adjacent end 54 of the unrolled tape material 12 has been held to roller 28 and has begun rolling partially around the second roller 28 to remove from the backing paper 14 more of the cut unrolled tape material 12 from the separated second adjacent end 54 towards the cut second portion 48. The backing paper 14 has remained intact substantially in its position of FIG. 4.

Figure 6:
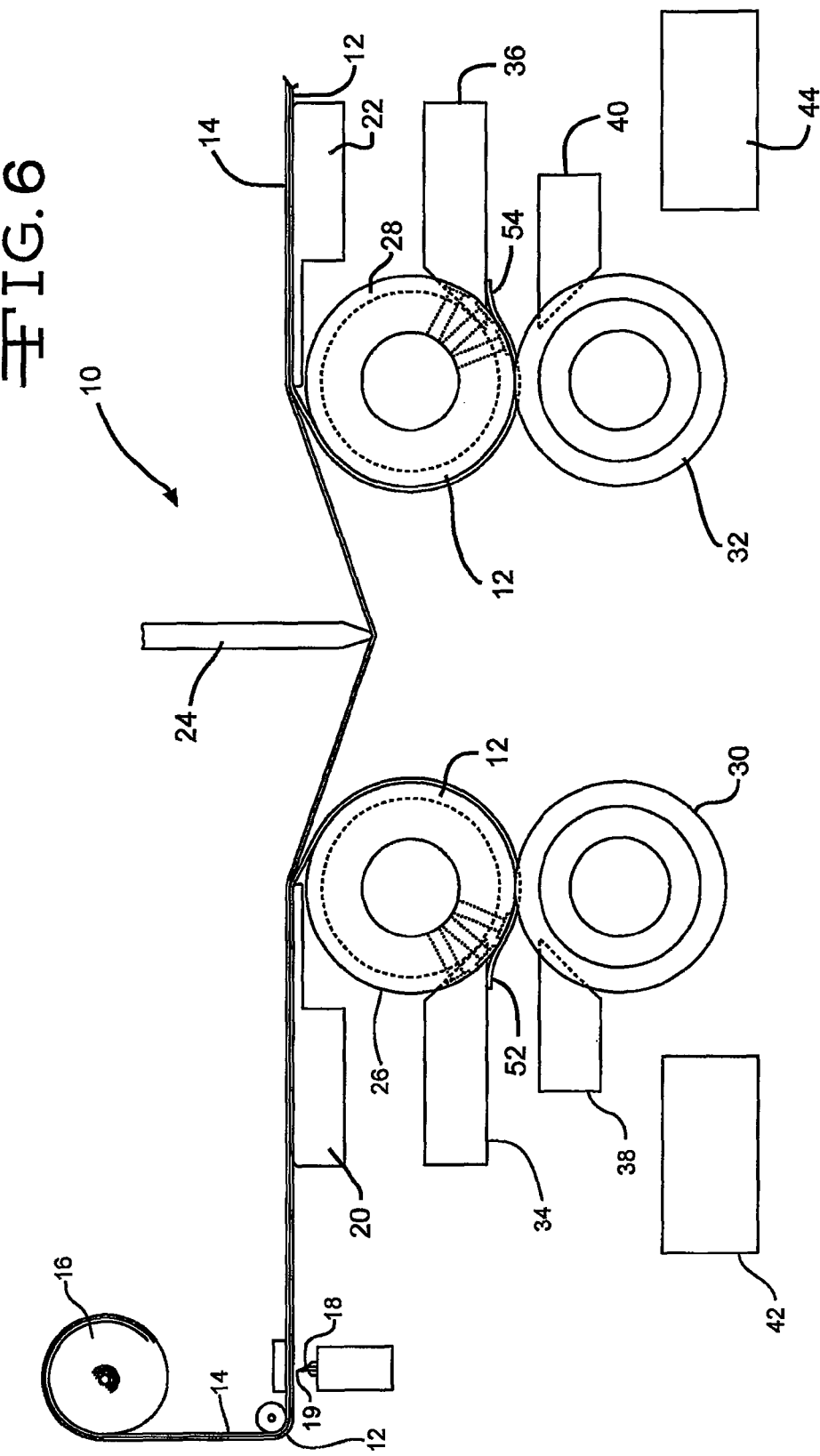
FIG. 6 is the same view of the embodiment of FIG. 5 at a different stage with the cut unrolled tape material rolling further around the rollers and scraping members scraping a portion of the cut unrolled tape material off the rollers.

FIG. 6 is the same view of the embodiment of FIG. 5 at a different stage with the first roller 26 having been rolled further clockwise, the second roller 28 having been rolled further counterclockwise, the third roller 30 having been rotated further counterclockwise, and the fourth roller 32 having been rotated further clockwise. As shown, the third roller 30 has pinched the separated first adjacent end 52 of the unrolled tape material 12 against the first roller 26, and forced the separated first adjacent end 52 to pass between the third roller 30 and the first roller 26. The clockwise rotation of the first roller 26 and the counterclockwise rotation of the third roller 30 has caused the separated first adjacent end 52 to come in contact with the first scraping member 34 which has scraped the separated first adjacent end 52 off the first roller 26.

Similarly, the fourth roller 32 has pinched the separated second adjacent end 54 of the unrolled tape material 12 against the second roller 28, and forced the separated second adjacent end 54 to pass between the fourth roller 32 and the second roller 28. The counterclockwise rotation of the second roller 28 and the clockwise rotation of the fourth roller 32 has caused the separated second adjacent end 54 to come in contact with the second scraping member 36 which has scraped the separated second adjacent end 54 off the second roller 28. In other embodiments, the third scraping member 38 may scrape the separated first adjacent end 52 off the third roller 30, and the fourth scraping member 40 may scrape the separated second adjacent end 54 off the fourth roller 32. Once the tape material is trapped by the pinch rollers 30 and 32, the vacuum attraction forces 27 and 29 may be turned off to ease the scraping of the tape material from the vacuum rollers 26 and 28.

Figure 7:
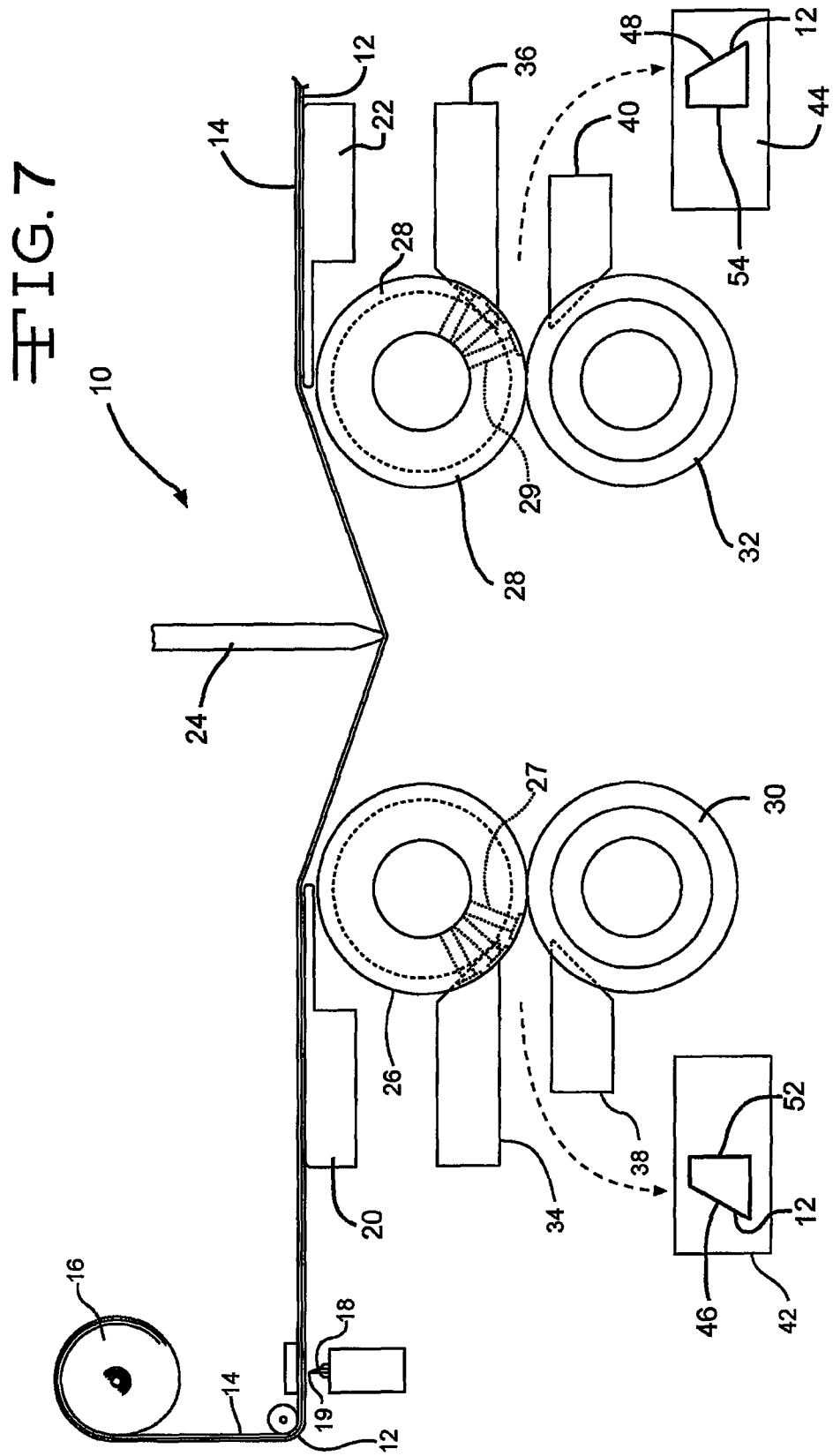
FIG. 7 is the same view of the embodiment of FIG. 6 at a different stage with the cut unrolled tape material being deposited in scrap bins.

FIG. 7 is the same view of the embodiment of FIG. 6 at a different stage with the first roller 26 having been rolled even further clockwise, the second roller 28 having been rolled even further counterclockwise, the third roller 30 having been rotated even further counterclockwise, and the fourth roller 32 having been rotated even further clockwise. As shown, the further rotation of the first and third rollers 26 and 30 along with the scraping of the first scraping member 34 has caused the cut unrolled tape material 12 to completely separate and be removed from the backing paper 14, from the separated first adjacent end 52 to the cut first portion 46, and be deposited in the first scrap bin 42.

Similarly, the further rotation of the second and fourth rollers 28 and 32 along with the scraping of the second scraping member 36 has caused the cut unrolled tape material 12 to completely separate and be removed from the backing paper 14, from the separated second adjacent end 54 to the cut second portion 48, and be deposited in the second scrap bin 44.

Figure 8:
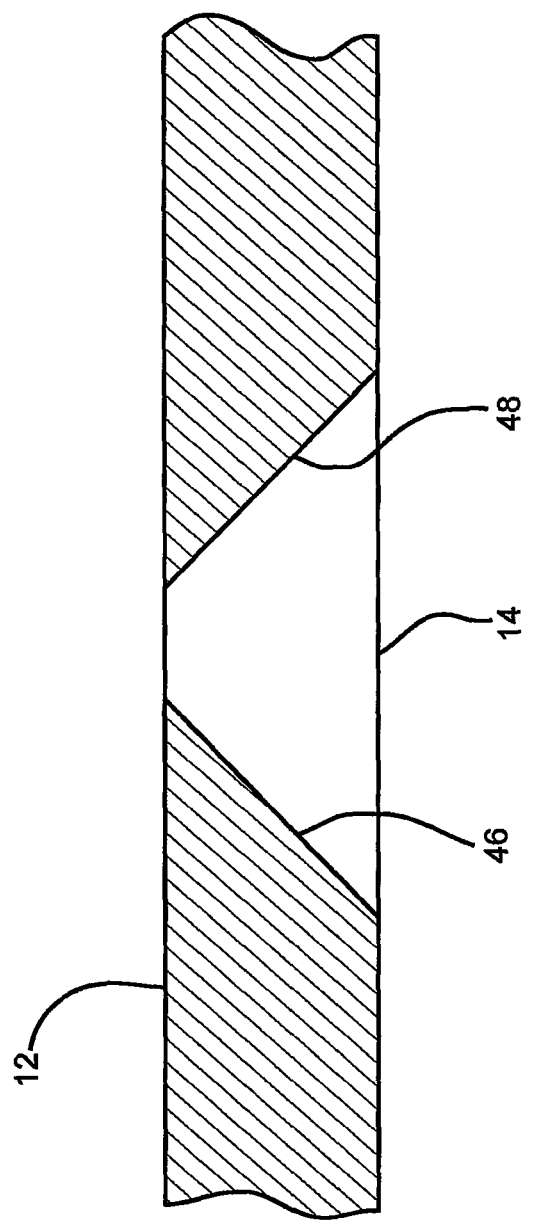
FIG. 8 shows a bottom view of the unrolled tape material of the embodiment of FIG. 2 after the cut tape portion has been completely removed from the backing paper using the apparatus of FIG. 1.

FIG. 8 shows a bottom view of the unrolled tape material 12 of the embodiment of FIG. 2 after the cut tape portion between the first and second portions 46 and 48 has been completely removed from the backing paper 14, as shown in FIG. 7. As can be seen, the backing paper 14 is intact with the cut tape portion between the first and second portions 46 and 48 completely removed.

Figure 9:
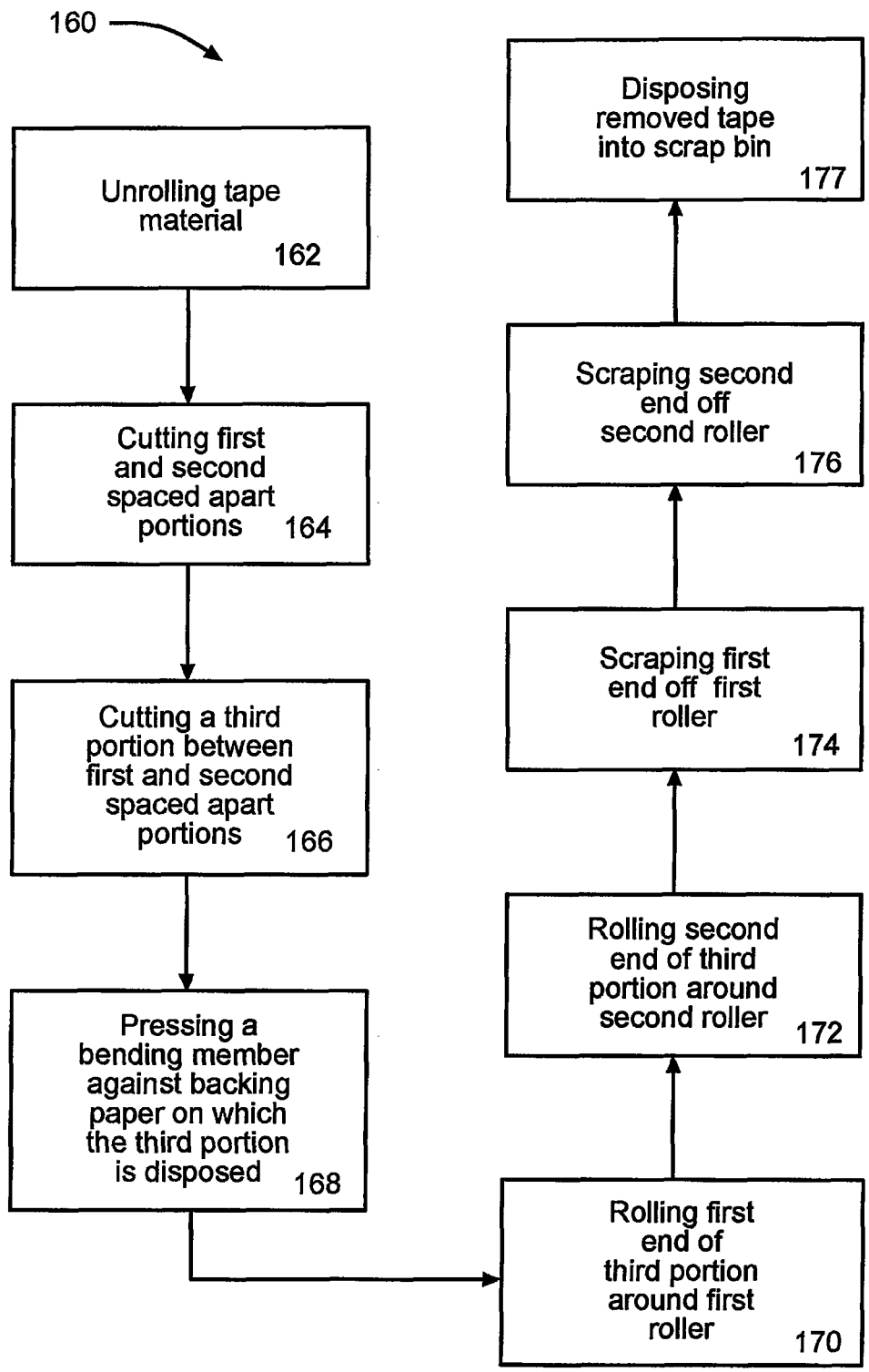
FIG. 9 shows an embodiment of a method of removing tape material from backing paper.

FIG. 9 shows an embodiment of a method 160 of removing tape material 12 from backing paper 14. The method 160 may utilize any of the herein disclosed embodiments of the apparatus 10, including any of its varying components. In one step 162, a tape material 12 is unrolled on backing paper 14 from a supply reel 16. In another step 164, first and second spaced apart portions 46 and 48 of the unrolled tape material 12 are cut while the unrolled tape material 12 is still on the backing paper 14.

The cut first and second spaced apart portions 46 and 48 may comprise spaced apart angular cuts of the unrolled tape material 12 on the backing paper 14. A cutting member 18 may be utilized having at least one sharp edge 19. In yet another step 166, a third portion 50 may be cut, while still on the backing paper 14, of the unrolled tape material 12 between the cut first and second spaced apart portions 46 and 48 of the unrolled tape material 12. A cutting member 18 may again be utilized having at least one sharp edge 19. The third portion 50 may comprise cut first and second adjacent ends 52 and 54. The third portion 50 may further comprise a perpendicular, straight cut in the unrolled tape material 12 which is still on the backing paper 14. The third portion 50 may be substantially in a center 17 of the cut first and second spaced apart portions 46 and 48.

In an additional step 168, a bending member 24, which may comprise a bar member, may be pressed against a portion of the backing paper 14, which the cut third portion 50 is disposed on, to begin to separate the cut first and second adjacent ends 52 and 54 of the unrolled tape material 12 from the backing paper 14. The bending member 24 may press the cut first adjacent end 52 against a first roller 26 and the cut second adjacent end 54 against a second roller 28.

In still another step 170, the cut first adjacent end 52 may be rolled at least partially around the first roller 26, which may comprise a vacuuming vacuum roller, to remove from the backing paper 14 the cut unrolled tape material 12 between the first cut adjacent end 52 and the cut first portion 46. The cut first adjacent end 52 may be rolled between a first vacuum roller 26 and a third pinch roller 30. In yet another step 172, the second adjacent end 54 may be rolled at least partially around a second roller 28, which may comprise a vacuuming vacuum roller, to remove from the backing paper 14 the cut unrolled tape material 12 between the cut second adjacent end 54 and the cut second portion 48. The cut second adjacent end 54 may be rolled between a second vacuum roller 28 and a fourth pinch roller 32.

In an additional step 174, the cut first adjacent end 52 may be scraped off at least one of the first roller 26 and the third roller 30 using at least one scraping member 34 and 38. In still another step 176, the cut second adjacent end 54 may be scraped off at least one of the second roller 28 and the fourth roller 32 using at least another scraping member 36 and 40. In another step 177, the removed cut unrolled tape material 12 may be disposed into at least one scrap bin 42 and 44.

One or more embodiments of the disclosure may reduce and/or eliminate one or more problems which may have been experienced by one or more of the existing apparatus or methods. For instance, one or more embodiments of the disclosure may reduce the numbers and amounts of backing paper needed, may reduce costs, may reduce the number of machines required, may substantially reduce time since the process may be carried out without transferring cut tape to new backing paper, may lead to less wrinkling and/or tension in the tape material against the backing paper since new backing paper is not required, may improve the adherence of the cut tape to the backing paper since new backing paper is not required, may reduce tacking problems, may reduce problems in transferring tape resin to new backing paper, may improve efficiency, may be less complex, may be more reliable, may be more accurate, may make it less difficult to place tape against working surfaces by providing improved tracking and guidance, may reduce tape lifting from working surfaces, and/or may reduce and/or eliminate one or more other types of problems in one or more of the existing apparatus and/or methods.

Figure 10:
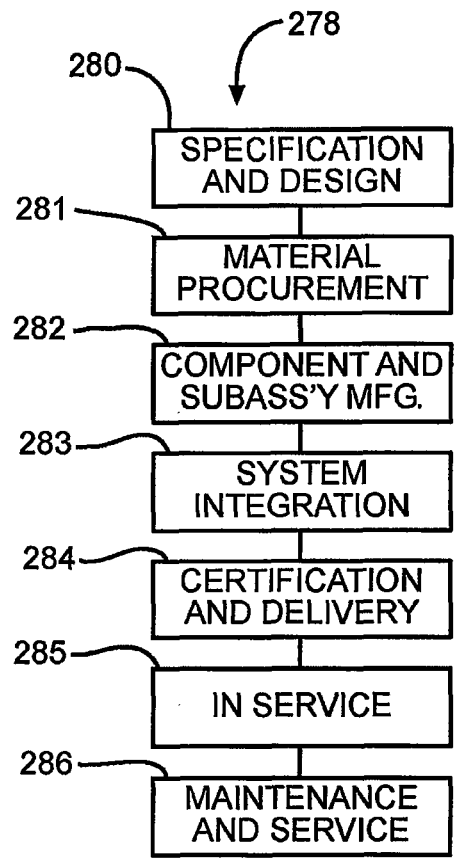
FIG. 10 is a flow diagram of an aircraft production and service methodology.
Figure 11:
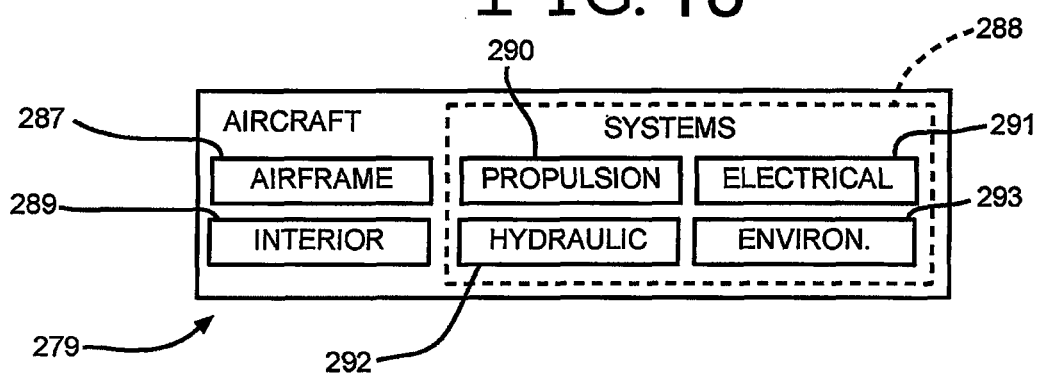
FIG. 11 is a block diagram of an aircraft.

Referring more particularly to the drawings, embodiments of the disclosure may be described in the context of an aircraft manufacturing and service method 278 as shown in FIG. 10 and an aircraft 279 as shown in FIG. 11. During pre-production, exemplary method 278 may include specification and design 280 of the aircraft 279 and material procurement 281. During production, component and subassembly manufacturing 282 and system integration 283 of the aircraft 279 takes place. Thereafter, the aircraft 279 may go through certification and delivery 284 in order to be placed in service 285. While in service by a customer, the aircraft 279 is scheduled for routine maintenance and service 286 (which may also include modification, reconfiguration, refurbishment, and so on).

Each of the processes of method 278 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 279 produced by exemplary method 278 may include an airframe 287 with a plurality of systems 288 and an interior 289. Examples of high-level systems 288 include one or more of a propulsion system 290, an electrical system 291, a hydraulic system 292, and an environmental system 293. Any number of other systems may be included. Although an aerospace example is shown, the principles of the invention may be applied to other industries, such as the automotive industry.

Apparatus and methods embodied herein may be employed during any one or more of the stages of the production and service method 278. For example, components or subassemblies corresponding to production process 282 may be fabricated or manufactured in a manner similar to components or subassemblies produced while the aircraft 279 is in service. Also, one or more apparatus embodiments, method embodiments, or a combination thereof may be utilized during the production stages 282 and 283, for example, by substantially expediting assembly of or reducing the cost of an aircraft 279. Similarly, one or more of apparatus embodiments, method embodiments, or a combination thereof may be utilized while the aircraft 279 is in service, for example and without limitation, to maintenance and service 286.

It should be understood, of course, that the foregoing relates to exemplary embodiments of the disclosure and that modifications may be made without departing from the spirit and scope of the disclosure as set forth in the following claims.

What is claimed is:

1. An apparatus for removing tape material from backing paper comprising:
   a supply reel for supplying and unrolling tape material on backing paper;

at least one cutting member for cutting first and second spaced apart cuts in unrolled tape material while still on backing paper, and for cutting a third cut between the first and second spaced apart cuts, in the unrolled tape material while still on the backing paper;

at least one bending member for pressing against the backing paper to separate first and second adjacent portions, disposed on opposite sides of the third cut, of unrolled tape material from the backing paper;

a first vacuum roller for rolling a first adjacent portion of the unrolled tape material at least partially around the first vacuum roller to remove from the backing paper the first adjacent portion; and a second vacuum roller adjacent to the first vacuum roller for rolling a second adjacent portion of the unrolled tape material at least partially around the second vacuum roller to remove from the backing paper the second adjacent portion.

2. The apparatus of claim 1 wherein the tape material comprises at least one of a composite, graphite, ceramic, aramid, and glass, from backing paper.

3. The apparatus of claim 1 wherein the at least one cutting member has at least one edge.

4. The apparatus of claim 1 wherein the at least one cutting member is for cutting the first and second spaced apart cuts non-parallel to a longitudinal axis of the unrolled tape material.

5. The apparatus of claim 1 wherein the at least one cutting member is for cutting the third cut perpendicular to a longitudinal axis of the unrolled tape material.

6. The apparatus of claim 1 wherein the at least one cutting member is for cutting the third cut equidistant from each of the first and second spaced apart cuts.

7. The apparatus of claim 1 wherein the bending member comprises a bar member.

8. The apparatus of claim 1 wherein the bending member is further for pressing the first adjacent portion of the unrolled tape material against the first vacuum roller and for pressing the second adjacent portion of the unrolled tape material against the second vacuum roller.

9. The apparatus of claim 1 wherein the first vacuum roller is further for vacuuming the first adjacent portion of the unrolled tape material against the first vacuum roller and the second vacuum roller is further for vacuuming the second adjacent portion of the unrolled tape material against the second vacuum roller.

10. The apparatus of claim 1 further comprising a first pinch roller adjacent to the first vacuum roller and a second pinch roller adjacent to the second vacuum roller, wherein the first pinch roller is for pinching the first adjacent portion of the unrolled tape material against the first vacuum roller and the second pinch roller is for pinching the second adjacent portion of the unrolled tape material against the second vacuum roller.

11. The apparatus of claim 10 further comprising a plurality of scraping members, wherein at least one of the scraping members is for scraping the first adjacent portion of the unrolled tape material off at least one of the first vacuum roller and the first pinch roller and at least another of the scraping members is for scraping the second adjacent portion of the unrolled tape material off at least one of the second vacuum roller and the second pinch roller.

12. The apparatus of claim 1 further comprising at least one scrap bin for disposing of the first and second adjacent portions.

13. The apparatus of claim 1 further comprising at least one shelf member for preventing contact between portions of unrolled tape material on backing paper and the first and second vacuum rollers.

* * * * *